United States Patent
Zhou

(10) Patent No.: US 12,184,869 B2
(45) Date of Patent: Dec. 31, 2024

(54) ADAPTIVE QUANTIZATION MATRIX FOR EXTENDED REALITY VIDEO ENCODING

(71) Applicant: Apple Inc., Cupertino, CA (US)

(72) Inventor: Yi Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/821,981

(22) Filed: Aug. 24, 2022

(65) Prior Publication Data
US 2023/0067584 A1    Mar. 2, 2023

Related U.S. Application Data

(60) Provisional application No. 63/237,830, filed on Aug. 27, 2021.

(51) Int. Cl.
*H04N 19/167* (2014.01)
*H04N 19/119* (2014.01)
*H04N 19/124* (2014.01)
*H04N 19/14* (2014.01)
*H04N 19/17* (2014.01)

(52) U.S. Cl.
CPC ......... *H04N 19/167* (2014.11); *H04N 19/119* (2014.11); *H04N 19/124* (2014.11); *H04N 19/14* (2014.11); *H04N 19/17* (2014.11)

(58) Field of Classification Search
CPC .. H04N 19/167; H04N 19/119; H04N 19/124; H04N 19/14; H04N 19/17
See application file for complete search history.

(56) References Cited

U.S. PATENT DOCUMENTS

| 9,584,814 B2 | 2/2017 | Socek |
| 10,230,950 B2 | 3/2019 | Peng |

(Continued)

FOREIGN PATENT DOCUMENTS

| CN | 104239271 | * | 9/2014 |
| CN | 108540801 | * | 3/2017 |

OTHER PUBLICATIONS

Tian, translation of CN 108540801 Mar. 2017 (Year: 2017).*
Cheng translation of CN 104239271 Sep. 2014 (Year: 2014).*
Extended Reality, Wikipedia, 2023 (Year: 2023).*

*Primary Examiner* — Zaihan Jiang
(74) *Attorney, Agent, or Firm* — Blank Rome LLP

(57) ABSTRACT

Encoding an extended-reality (XR) video frame may include obtaining an XR video frame comprising a background image and a virtual object; obtaining, from an image renderer, a first region of the background image over which the virtual object is overlaid; dividing the XR video frame into a virtual region and a real region, wherein the virtual region comprises the first region of the background image and the virtual object and the real region comprises a second region of the background image; determining, for the virtual region, a corresponding first quantization parameter based on an initial quantization parameter associated with virtual regions; determining, for the real region, a corresponding second quantization parameter based on an initial quantization parameter associated with real regions; and encoding the virtual region based on the corresponding first quantization parameter and the real region based on the corresponding second quantization parameter.

20 Claims, 13 Drawing Sheets

(56) References Cited

U.S. PATENT DOCUMENTS

| | | | |
|---|---|---|---|
| 2009/0305204 A1* | 12/2009 | Connolly | G09B 7/02 |
| | | | 434/219 |
| 2010/0073568 A1* | 3/2010 | Van Ostrand | H04N 9/3123 |
| | | | 348/E5.062 |
| 2010/0115411 A1* | 5/2010 | Sorokin | H04N 7/15 |
| | | | 348/148 |
| 2010/0287511 A1* | 11/2010 | Meier | G06T 15/20 |
| | | | 715/848 |
| 2017/0359575 A1* | 12/2017 | Zhang | H04N 19/105 |
| 2019/0026934 A1* | 1/2019 | Shih | H04N 19/124 |
| 2020/0301506 A1 | 9/2020 | Young | |
| 2020/0314434 A1 | 10/2020 | Li | |
| 2020/0368616 A1* | 11/2020 | Delamont | H04N 13/239 |

* cited by examiner

ADAPTIVE QUANTIZATION MATRIX FOR EXTENDED REALITY VIDEO ENCODING

BACKGROUND

This disclosure relates generally to image processing. More particularly, but not by way of limitation, this disclosure relates to techniques and systems of video encoding.

Some video encoding systems use bit-rate control algorithms to determine how many bits to allocate to a particular region of a video frame to ensure a uniform picture quality for a given video-encoding standard and reduce the bandwidth needed to transmit the encoded video frame. Some bit-rate control algorithms use frame-level and macroblock-level content statistics such as complexity and contrast to determine quantization parameters and corresponding bit allocations. A quantization parameter is an integer mapped to a quantization step size and controls an amount of compression for each region of a video frame. For example, an eight by eight region of pixels is multiplied by the quantization parameter and divided by a quantization matrix. The resulting values are then rounded to the nearest integer. A large quantization parameter corresponds to higher quantization, more compression, and lower image quality than a small quantization parameter that corresponds to lower quantization, less compression, and higher image quality. Bit-rate control algorithms may use a constant quantization parameter or varying quantization parameters to accommodate a target average bitrate, a constant bitrate, a constant image quality, or the like. However, many bit-rate control algorithms are objective and cannot guarantee that more bits are allocated to a region of interest than to the background. Some bit-rate control algorithms are able determine a region of interest and allocate more bits to the region of interest than to the background, but they are often computationally-expensive and time-consuming to operate. What is needed is an improved technique to encode video frames.

DETAILED DESCRIPTION

Figure 1:
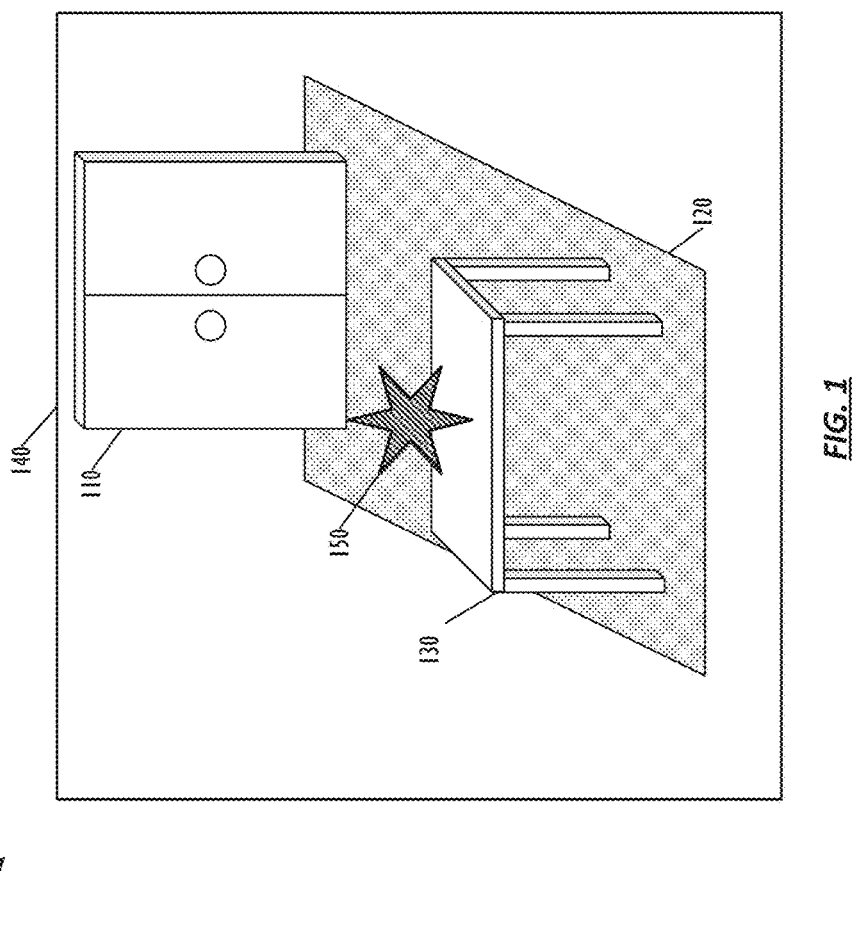
FIG. 1 shows an example diagram of an extended reality (XR) video frame.

This disclosure pertains to systems, methods, and computer readable media for a video-encoding extended reality (XR) video streams. In particular, an XR video frame comprising a background image and at least one virtual object may be obtained. A first region of the background image over which the at least one virtual object is to be overlaid may be obtained from an image renderer. The XR video frame may be divided into at least one virtual region and at least one real region. The at least one virtual region comprises the first region of the background image and the at least one virtual object. The at least one real region comprises a second region of the background image. For each of the at least one virtual regions, a corresponding first quantization parameter may be determined based on an initial quantization parameter associated with virtual regions. For each of the at least one real regions, a corresponding second quantization parameter may be determined based on an initial quantization parameter associated with real regions. Each of the at least one virtual regions may be encoded based on the corresponding first quantization parameter, and each of the at least one real regions may be encoded based on the corresponding second quantization parameter.

Various examples of electronic systems and techniques for using such systems in relation to encoding extended reality video streams are described.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of video encoding systems having the benefit of this disclosure.

FIG. 1 shows an example diagram of an XR video frame 100. The XR video frame 100 includes a background image 140 showing real objects, such as the dresser 110, the rug 120, and the table 130, and a virtual object 150 that is overlaid with the background image 140 such that the virtual object 150 appears atop the table 130. The background image 140 is described as a "background image" to indicate the image is behind the virtual object 150 and may have a foreground region and a background region. With XR video, viewers often focus on virtual objects and the areas immediately surrounding the virtual objects, rather than the background environment. For example, a viewer looking at the XR video frame 100 may focus on the virtual object 150 and the portion of the table 130 and rug 120 immediately surrounding the virtual object 150, rather than the dresser 110. Instead of performing computationally expensive and time consuming image analysis of each frame in an XR video to determine a region of interest based on the image content of each frame, a video-encoding system may use the virtual object 150 and the known region of the background image 140 over which the virtual object 150 is placed to determine a region of interest for the viewer. Based on the virtual object 150 and its position over the background image 140, the video-encoding system may allocate more bits to the region of interest for the viewer than to the remainder of background image 140.

Figure 2:
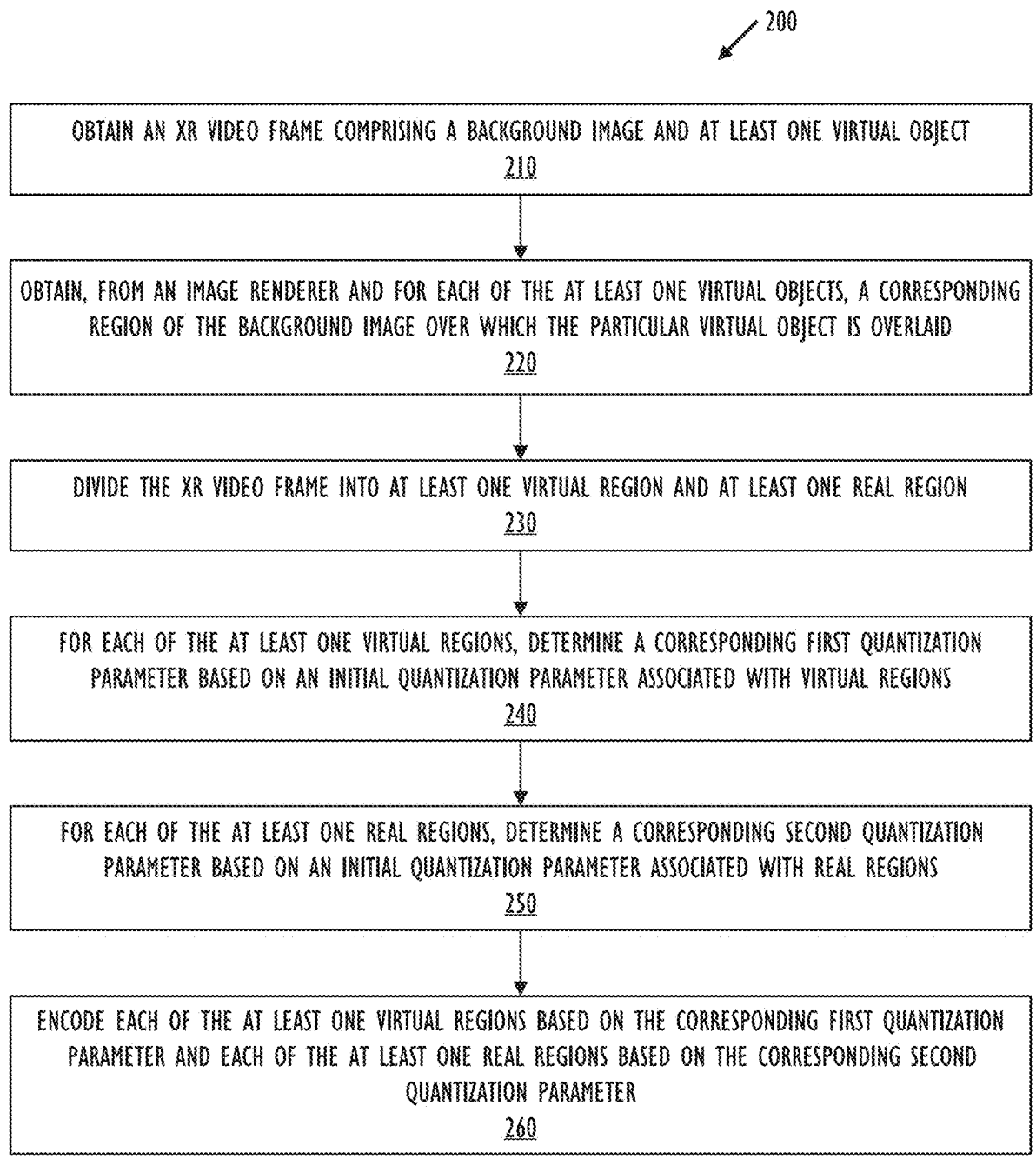
FIG. 2 shows, in flow chart form, an example process for encoding an extended reality video frame based on an adaptive quantization matrix.

FIG. 2 shows, in flow chart form, an example process 200 for encoding an XR video frame 100 based on an adaptive quantization matrix. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added. For ease of explanation, the process 200 is described with reference to the XR video frame 100 shown in FIG. 1.

The flowchart begins at step 210, where an electronic device obtains an XR video frame 100 comprising a background image 140 and at least one virtual object 150. At step 220, the electronic device obtains, from an image renderer, a first region of the background image 140 over which the virtual object 150 is overlaid. For example, the first region of the background image 140 may indicate the portion of the rug 120 and table 130 over which the virtual object 150 is positioned. The electronic device divides the XR video frame 100 into at least one virtual region and at least one real region based on the first region of the background image 140 at step 230. The virtual region includes at least a portion of the virtual object. The virtual region may further include the entire virtual object, and include none of the background image or a portion of the background image. For example, a virtual region may include the virtual object 150 and a portion of the rug 120 and table 130, and a real region may include the remainder of the background image 140, such as the dresser 110 and the other portions of the rug 120 and the table 130.

At step 240, the electronic device determines, for each of the at least one virtual regions, a corresponding first quantization parameter based on an initial quantization parameter associated with virtual regions. For example, the electronic device may determine an image complexity of a particular virtual region is greater than an image complexity of a reference virtual region associated with the initial quantization parameter for virtual regions and decrease the initial quantization parameter by a proportional amount. At step 250, the electronic device determines, for each of the at least one real regions, a corresponding second quantization parameter based on an initial quantization parameter associated with real regions. For example, the electronic device may determine an image complexity of a particular real region is less than an image complexity of a reference real region associated with the initial quantization parameter for real regions and increase the initial quantization parameter by a proportional amount. The initial quantization parameter associated with virtual regions may be smaller than the initial quantization parameter associated with real regions to indicate a larger amount of detail and complexity in the virtual regions than in the real regions. That is, the initial quantization parameters associated with the virtual and real regions may be chosen such that the virtual regions corresponding to the viewer's region of interest are allocated more bits than real regions outside the region of interest during video encoding of the XR video frame 100. At step 260, the electronic device encodes the at least one virtual region based on the first quantization parameter and the at least one real region based on the second quantization parameter. The resulting encoded XR video frame allocates more bits to the at least one virtual region based on the first quantization parameter than to the at least one real region based on the second quantization parameter.

Figure 3:
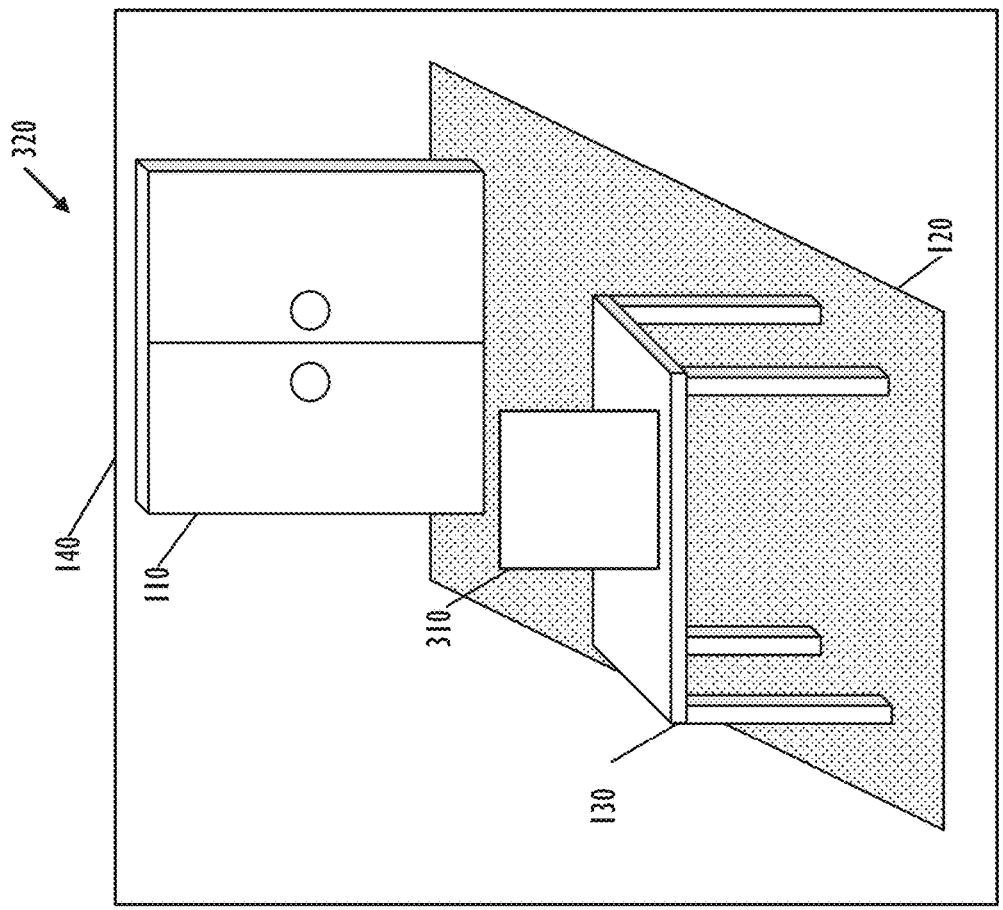
FIG. 3 shows an example diagram of an extended reality video frame divided into a virtual region and a real region.
Figure 3:
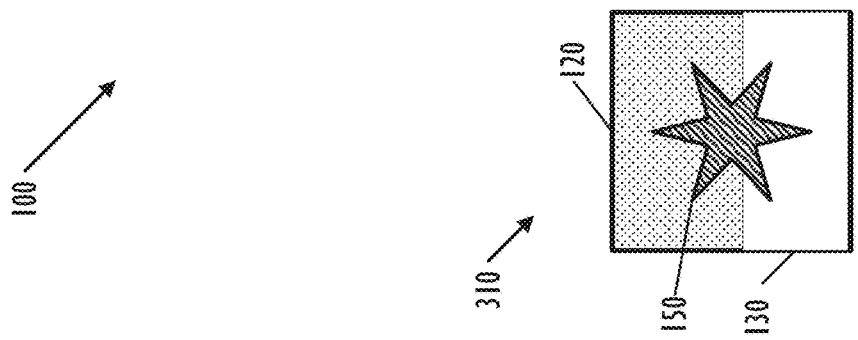

FIG. 3 shows an example diagram of the XR video frame 100 shown in FIG. 1 divided into a virtual region 310 and a real region 320. In step 230 of process 200, the electronic device divides the XR video frame 100 into a virtual region 310 and a real region 320. The virtual region 310 includes the virtual object 150 and a portion of the background image 140 around the virtual object 150, showing the surface of the table 130 and a portion of the rug 120. In this example, the virtual region 310 includes the entire virtual object 150 and a portion of the background image 140, but in other implementations, the virtual region 310 may include the entire virtual object 150 but omit the portion of the background image 140, or include a portion of the virtual object 150 and a portion of the background image 140, or include a portion of the virtual object but omit the portion of the background image 140. The negative space in the real region 320 indicates where the virtual region 310 is located. The virtual region 310 and the real region 320 may be divided into one or more additional, smaller regions to allow further refinement of the quantization parameters based on the complexity, contrast, etc. in different portions of the regions 310 and 320.

Figure 4:
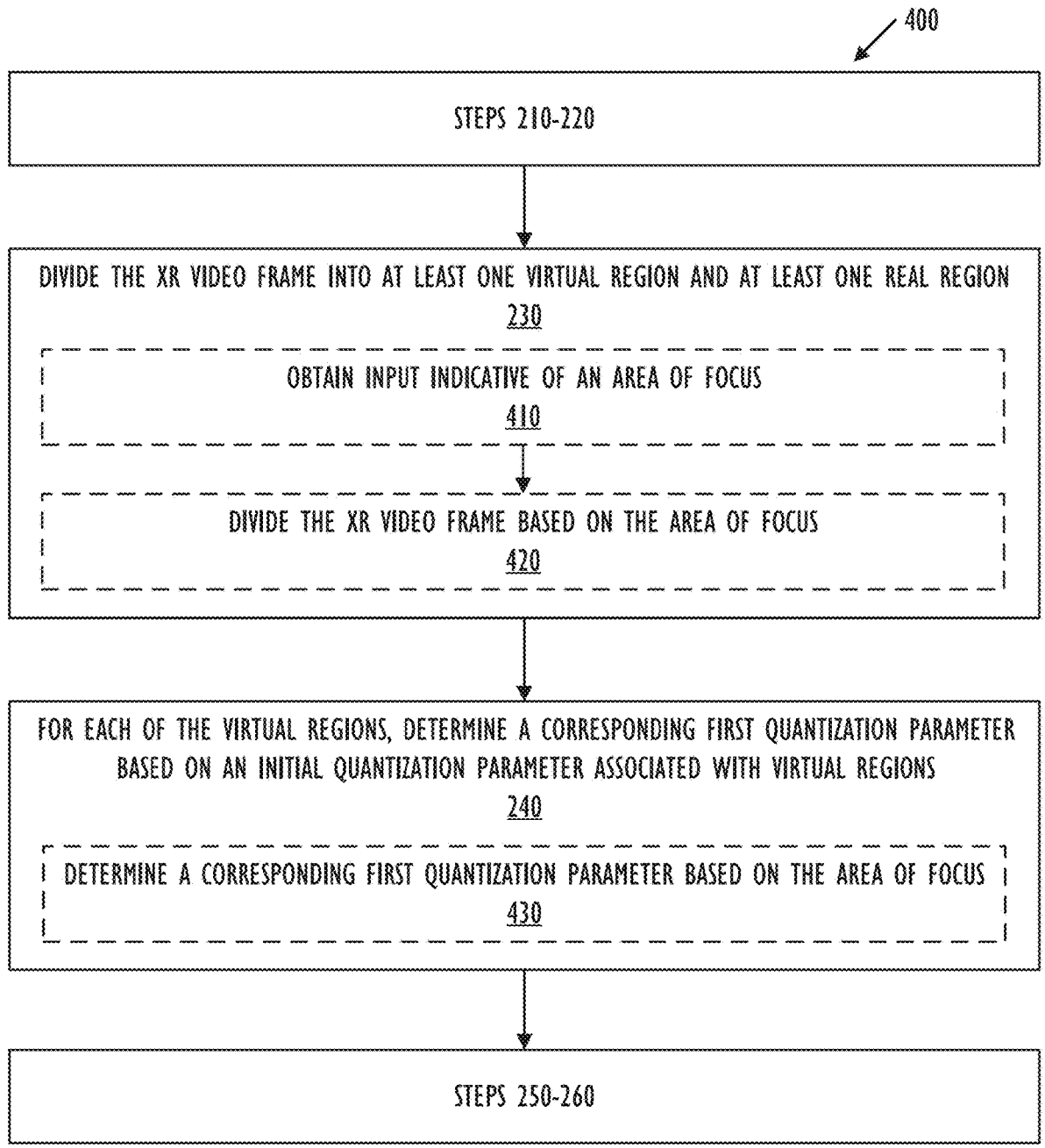
FIG. 4 shows, in flowchart form, an example process for encoding an extended reality video frame based on an adaptive quantization matrix and input from a gaze-tracking user interface.

FIG. 4 shows, in flowchart form, an example process 400 for encoding an XR video frame based on an adaptive quantization matrix and input from a gaze-tracking user interface. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added. For ease of explanation, the process 400 is described with reference to the process 200 described herein with reference to FIG. 2.

The flowchart 400 begins with steps 210 and 220, as described above with reference to FIG. 2. Dividing the XR video frame into at least one virtual region and at least one real region in step 230 may optionally include steps 410 and 420. At step 410, the electronic device obtains input indicative of an area of focus, for example via a gaze-tracking user interface, a cursor-based user interface, and the like. For example, where the XR video frame includes a plurality of virtual objects, the input indicative of an area of focus via a gaze-tracking user interface may indicate which particular virtual object the user is looking at out of the plurality of virtual objects.

At step 420, the electronic device divides the XR video frame into the at least one virtual region and the at least one real region based on the area of focus. The electronic device may divide the particular virtual object and the corresponding portion of the background image over which the particular virtual object is overlaid into a unique virtual region and the remaining virtual objects out of the plurality of virtual objects into one or more additional virtual regions. Similarly, the electronic device may divide the remaining portions of the background image not included in the real regions into one or more additional, smaller regions to further refine the quantization parameters based on the complexity, contrast, etc. in different regions of the remaining portion of the background image.

Determining, for each of the virtual regions, a corresponding first quantization parameter based on an initial quantization parameter associated with virtual regions at step 240 may optionally include step 430. At step 430, the electronic device determines a corresponding first quantization parameter based on the area of focus indicated by the input from the gaze-tracking user interface. For example, the first quantization parameter for the virtual region that includes the area of focus may be smaller than the first quantization parameter for other virtual regions. That is, the virtual region that includes the area of focus may be allocated more bits and encoded with a higher resolution than the other virtual regions. The electronic device proceeds to steps 250 and 260, as described above with reference to FIG. 2 and based on the regions of the XR video frame as divided in step 420 and the corresponding first quantization parameters determined at step 430.

Figure 5A:
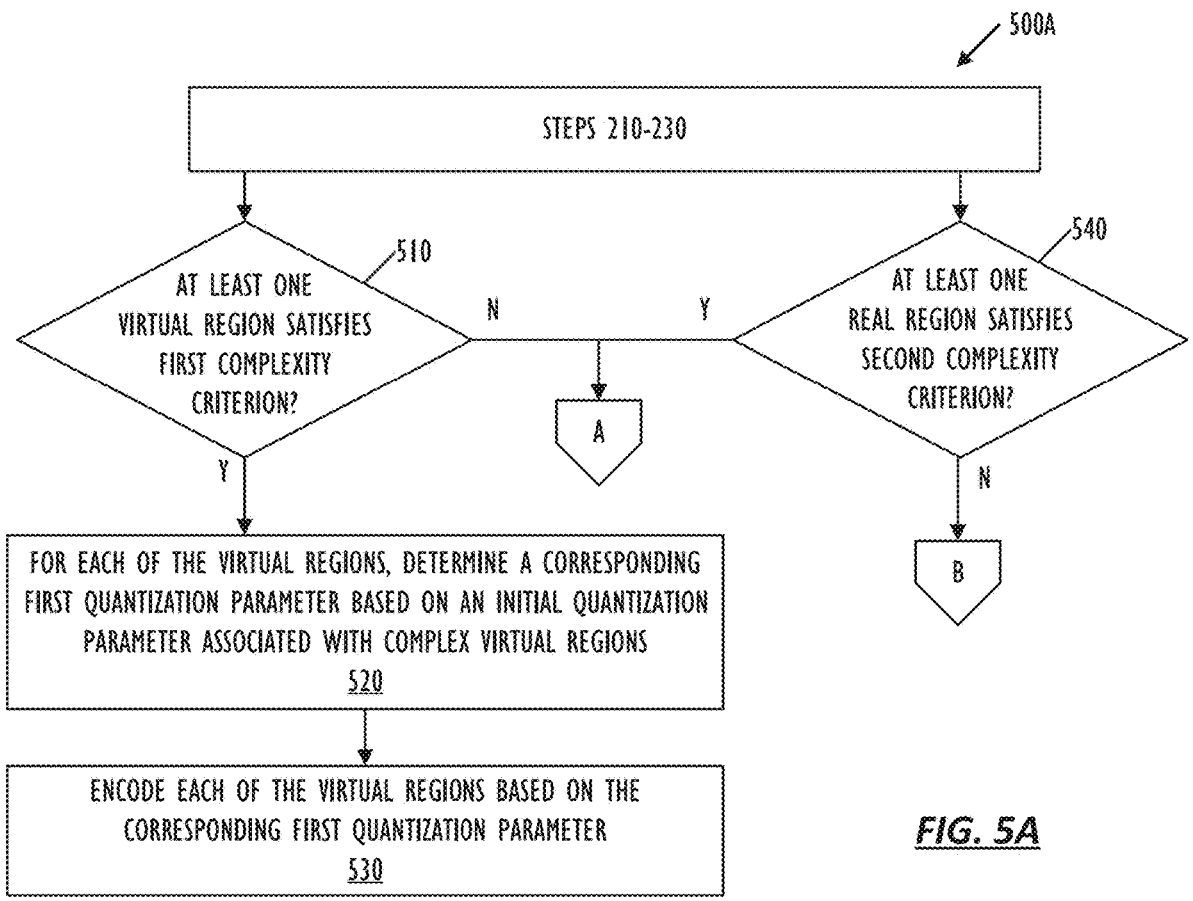
FIGS. 5A-C show, in flowchart form, an example process for encoding an extended reality video frame based on an adaptive quantization matrix and first and second complexity criteria.
Figure 5B:
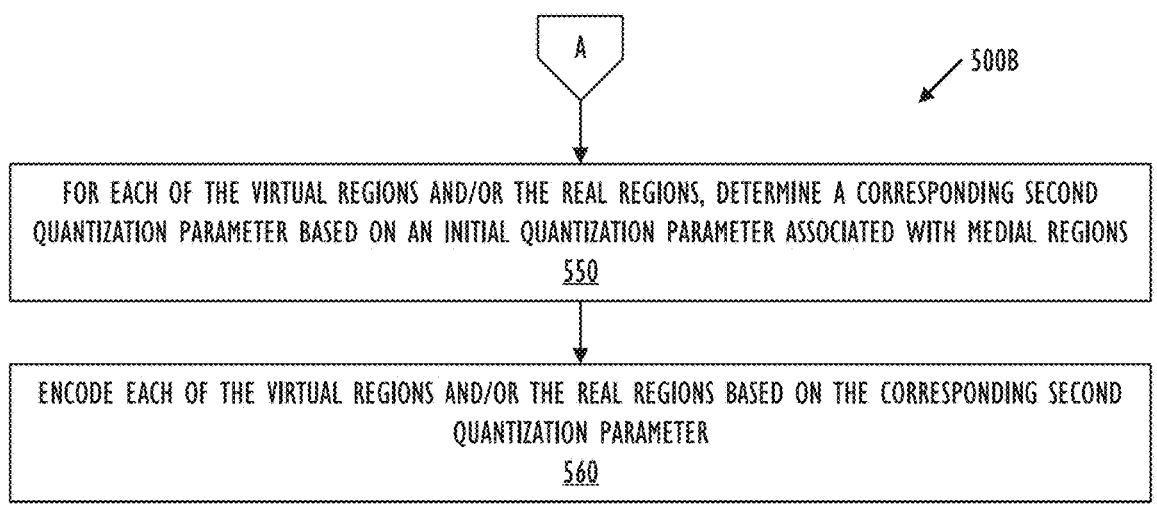
Figure 5C:
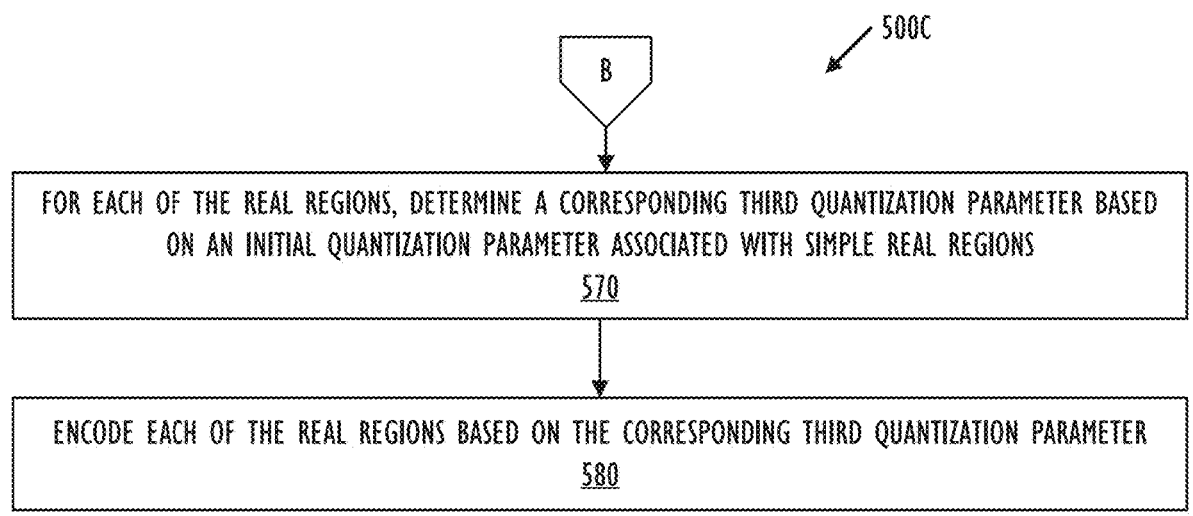

FIGS. 5A-C show, in flowchart form, an example process 500 for encoding an XR video frame based on an adaptive quantization matrix and first and second complexity criteria. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added. For ease of explanation, the process 500 is described with reference to the process 200 described herein with reference to FIG. 2 and the XR video frame 100 described herein with reference to FIG. 1.

The flowchart 500 begins in FIG. 5A with steps 210, 220, and 230 as described above with reference to FIG. 2. After dividing the XR video frame into at least one virtual region and at least one real region, the electronic device proceeds to step 510 and determines whether at least one virtual region satisfies a first complexity criterion. The first complexity criterion may be representative of a threshold amount of image complexity, contrast, and the like, such that virtual regions that satisfy the first complexity criterion are more complex than virtual regions that do not satisfy the first complexity criterion and are considered complex virtual regions. For example, a complex virtual region that satisfies the first complexity criterion may include a highly-detailed virtual object, such as a user avatar's face, while a virtual region that does not satisfy the first complexity criterion includes a comparatively simple virtual object, such as a ball. In response to determining at least one of the virtual regions satisfies the first complexity criterion, the electronic device proceeds to step 520 and determines, for each of the virtual regions that satisfy the first complexity criterion (that is, the complex virtual regions), a corresponding first quantization parameter based on an initial quantization parameter associated with complex virtual regions.

The corresponding first quantization parameter may further be determined based on a threshold upper limit and a threshold lower limit associated with complex virtual regions. In response to the first quantization parameter reaching the threshold upper or lower limit associated with complex virtual regions, the electronic device stops determining the corresponding first quantization parameter. The threshold upper and lower limits associated with complex virtual regions may be chosen based on the complexity of the virtual object 150 and the background image 140, the image quality requirements associated with a given video-encoding standard, the time allotted to the video-encoding process, and the like. For example, a particular video-encoding standard may set a range of valid values for the quantization parameter, and the threshold upper and lower limits may define the boundaries of the range of valid values according to the particular video-encoding standard. As another example, the first quantization parameter may be determined in an iterative process, and the threshold upper and lower limits may represent a maximum and a minimum number of iterations, respectively, that may be performed in the time allotted to the video encoding process. As a further example, the threshold upper and lower limits may represent image quality criterion associated with complex virtual regions. That is, the threshold upper limit may represent a maximum image quality for complex virtual regions at a particular bit rate, such that the bit rate is not slowed by the additional detail included in the complex virtual regions, and the threshold lower limit may represent a minimum image quality for complex virtual regions at the particular bit rate, such that a minimum image quality for complex virtual regions is maintained at the particular bit rate. At step 530, the electronic device encodes each of the virtual regions that satisfy the first complexity criterion based on the corresponding first quantization parameter.

Returning to step 510, in response to determining at least one virtual region does not satisfy the first complexity criterion, the electronic device proceeds to step 550 shown in process 500B of FIG. 5B. At step 550, the electronic device determines, for each of the virtual regions that do not satisfy the first complexity criterion (that is, the simple virtual regions), a corresponding second quantization parameter based on an initial quantization parameter associated with medial regions. Medial regions may include comparatively simple virtual regions that do not satisfy the first complexity criterion and comparatively complex real regions that satisfy the second complexity criterion. The initial quantization parameter associated with medial regions may be greater than the initial quantization parameter associated with complex virtual regions, such that medial regions are encoded using fewer bits and in a lower resolution than the number of bits and resolution with which complex virtual regions are encoded.

The corresponding second quantization parameter may further be determined based on a threshold upper limit and a threshold lower limit associated with medial regions. In response to the second quantization parameter reaching the threshold upper or lower limit associated with medial regions, the electronic device stops determining the corresponding second quantization parameter. The threshold upper and lower limits associated with medial regions may be chosen based on the complexity of the virtual object 150 and the background image 140, the image quality requirements associated with a given video-encoding standard, the time allotted to the video-encoding process, and the like. For example, a particular video-encoding standard may set a range of valid values for the quantization parameter, and the threshold upper and lower limits may define the boundaries of the range of valid values according to the particular video-encoding standard. As another example, the second quantization parameter may be determined in an iterative process, and the threshold upper and lower limits may represent a maximum and a minimum number of iterations, respectively, that may be performed in the time allotted to the video encoding process. As a further example, the threshold upper and lower limits may represent image quality criterion associated with medial regions. That is, the threshold upper limit may represent a maximum image quality for medial regions at a particular bit rate, such that the bit rate is not slowed by the additional detail included in the medial regions, and the threshold lower limit may represent a minimum image quality for medial regions at the particular bit rate, such that a minimum image quality for medial regions is maintained at the particular bit rate. In some implementations, the maximum and minimum image qualities for medial regions at a particular bit rate may be lower than the maximum and minimum image qualities for complex virtual regions at the particular bitrate, to ensure that more bits are allocated to the complex virtual regions than to the medial regions. The electronic device encodes each of the virtual regions that do not satisfy the first complexity criterion based on the corresponding second quantization parameter at step 560.

Returning to the at least one real region from step 230, the electronic device determines whether the at least one real region satisfies a second complexity criterion at step 540. The second complexity criterion may be representative of a threshold amount of image complexity, contrast, and the like, such that real regions that satisfy the second complexity criterion are more complex than real regions that do not satisfy the second complexity criterion and are considered complex real regions or medial regions. A complex real region that satisfies the second complexity criterion may include a highly-detailed portion of the background image 140 such as the portion of the background image 140 showing the legs of table 130 against the portion of the rug 120, which includes multiple edges and contrasts in texture and color between the table 130 and the rug 120. A real region that does not satisfy the second complexity criterion may include a comparatively simple portion of the background image 140, such as the dresser 110 and uniform portions of the walls and rug 120. In response to the at least one real region satisfying the second complexity criterion, the electronic device proceeds to step 550 shown in process 500B of FIG. 5B and described above. At step 550, the electronic device determines, for each of the real regions that satisfy the second complexity criterion (that is, the complex real regions), a corresponding second quantization parameter based on an initial quantization parameter associated with medial regions. The second quantization parameter for the at least one real region satisfying the second complexity criterion may be the same or different than the second quantization parameter for the at least one virtual region not satisfying the first complexity criterion. The electronic device then encodes each of the real regions that satisfy the second complexity criterion based on the corresponding second quantization parameter at step 560.

Returning to step 540, in response to determining the at least one real region does not satisfy the second complexity criterion, the electronic device proceeds to step 570 shown in process 500C of FIG. 5C. At step 570, the electronic device determines, for each of the real regions that do not satisfy the second complexity criterion (that is, the simple real regions), a corresponding third quantization parameter based on an initial quantization parameter associated with simple real regions. The initial quantization parameter associated with simple real regions may be greater than the initial quantization parameter associated with medial regions and the initial quantization parameter associated with complex virtual regions, such that simple real regions are encoded using fewer bits and in a lower resolution than the number of bits and resolution with which medial regions and complex virtual regions are encoded.

The corresponding third quantization parameter may further be determined based on a threshold upper limit and a threshold lower limit associated with simple real regions. In response to the third quantization parameter reaching the threshold upper or lower limit associated with simple real regions, the electronic device stops determining the corresponding third quantization parameter. The threshold upper and lower limits associated with simple real regions may be chosen based on the complexity of the background image 140, the image quality requirements associated with a given video-encoding standard, the time allotted to the video-encoding process, and the like. For example, a particular video-encoding standard may set a range of valid values for the quantization parameter, and the threshold upper and lower limits may define the boundaries of the range of valid values according to the particular video-encoding standard. As another example, the third quantization parameter may be determined in an iterative process, and the threshold upper and lower limits may represent a maximum and a minimum number of iterations, respectively, that may be performed in the time allotted to the video encoding process. As a further example, the threshold upper and lower limits may represent image quality criterion associated with simple real regions. That is, the threshold upper limit may represent a maximum image quality for simple real regions at a particular bit rate, such that the bit rate is not slowed by the additional detail included in the simple real regions, and the threshold lower limit may represent a minimum image quality for simple real regions at the particular bit rate, such that a minimum image quality for simple real regions is maintained at the particular bit rate. In some implementations, the maximum and minimum image qualities for simple real regions at a particular bit rate may be lower than the maximum and minimum image qualities for complex virtual regions and the maximum and minimum image qualities for medial regions at the particular bitrate, to ensure that more bits are allocated to the complex virtual regions and medial regions than to the simple real regions. The electronic device encodes each of the real regions that do not satisfy the second complexity criterion based on the corresponding third quantization parameter at step 580. While the process 500 illustrates three types of regions—complex virtual regions, medial regions, and simple real regions—any number of types of regions and corresponding complexity criterion, initial quantization parameters associated with the types of regions, and upper and lower threshold limits associated with the types of regions may be used instead.

Figure 6:
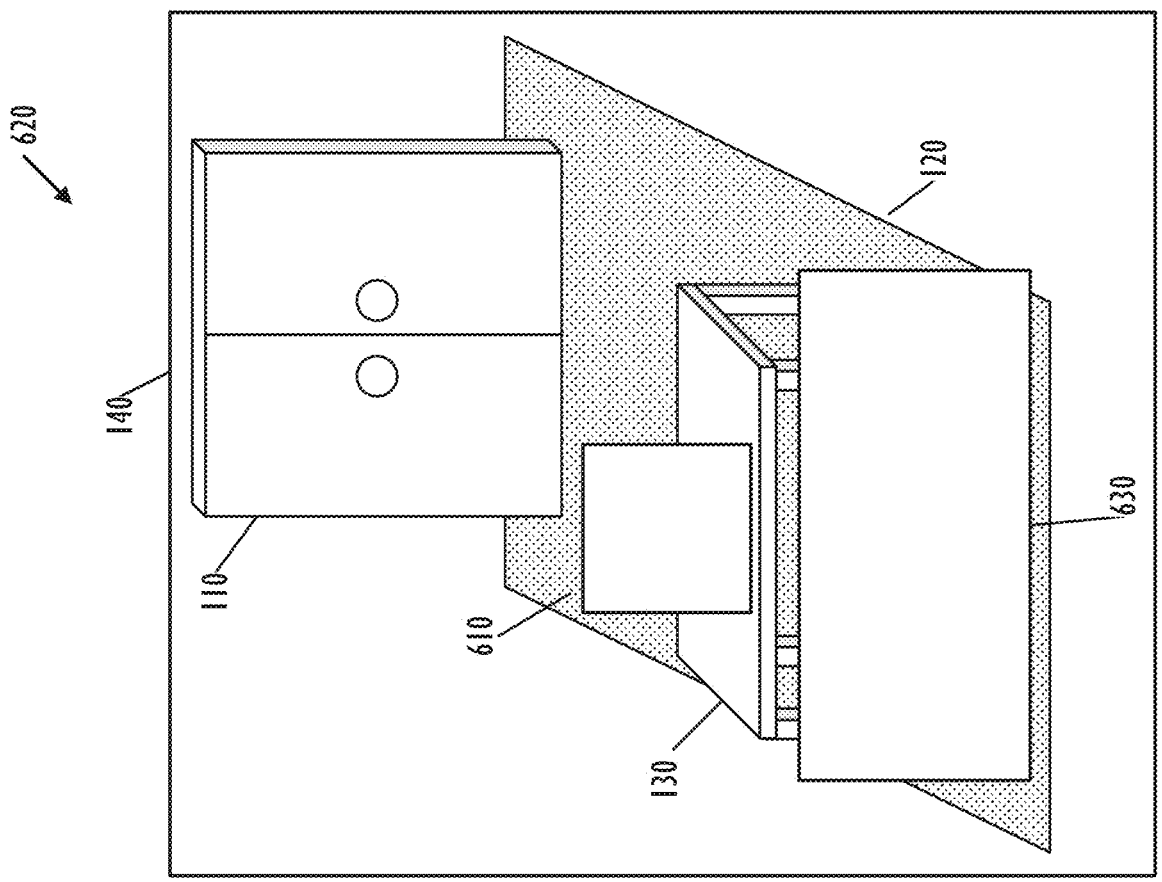
FIG. 6 shows an example diagram of an extended reality video frame divided into regions based on first and second complexity criteria.
Figure 6:
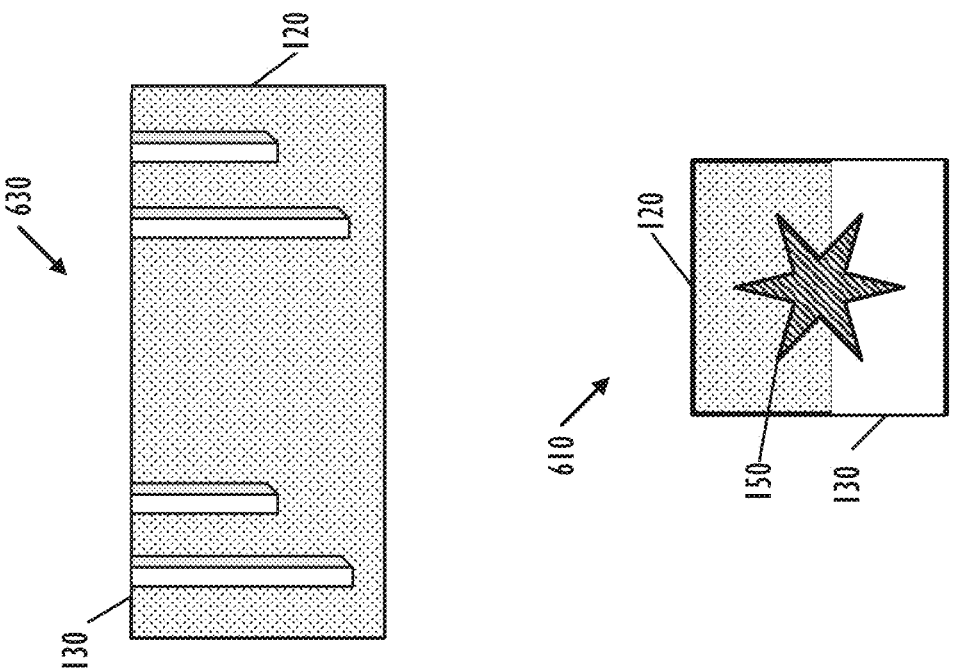

FIG. 6 shows an example diagram of the XR video frame 100 shown in FIG. 1 divided into regions based on the first and second complexity criteria discussed herein with respect to process 500. The virtual region 610 includes the virtual object 150 and a portion of the background image 140 around the virtual object 150, showing the surface of the table 130 and a portion of the rug 120. The virtual region 610 satisfies the first complexity criterion and so is encoded using the first quantization parameter. The simple real region 620 includes portions of the background image 140 that do not satisfy the second complexity criterion and shows the dresser 110, a portion of the rug 120, and a portion of the table 130. The simple real region 620 is encoded using the third quantization parameter. The medial region 630 includes portions of the background image 140 that satisfy the second complexity criterion and shows the legs of the table 130 against a portion of the rug 120. The medial region 630 is encoded using the second quantization parameter. The negative space in the simple real region 620 indicates where the virtual region 610 and the medial region 630 are located. The virtual region 610, the simple real region 620, and the medial region 630 may be divided into one or more additional, smaller regions to allow further refinement of the quantization parameters based on the complexity, contrast, etc. in different portions of each region.

Figure 7A:
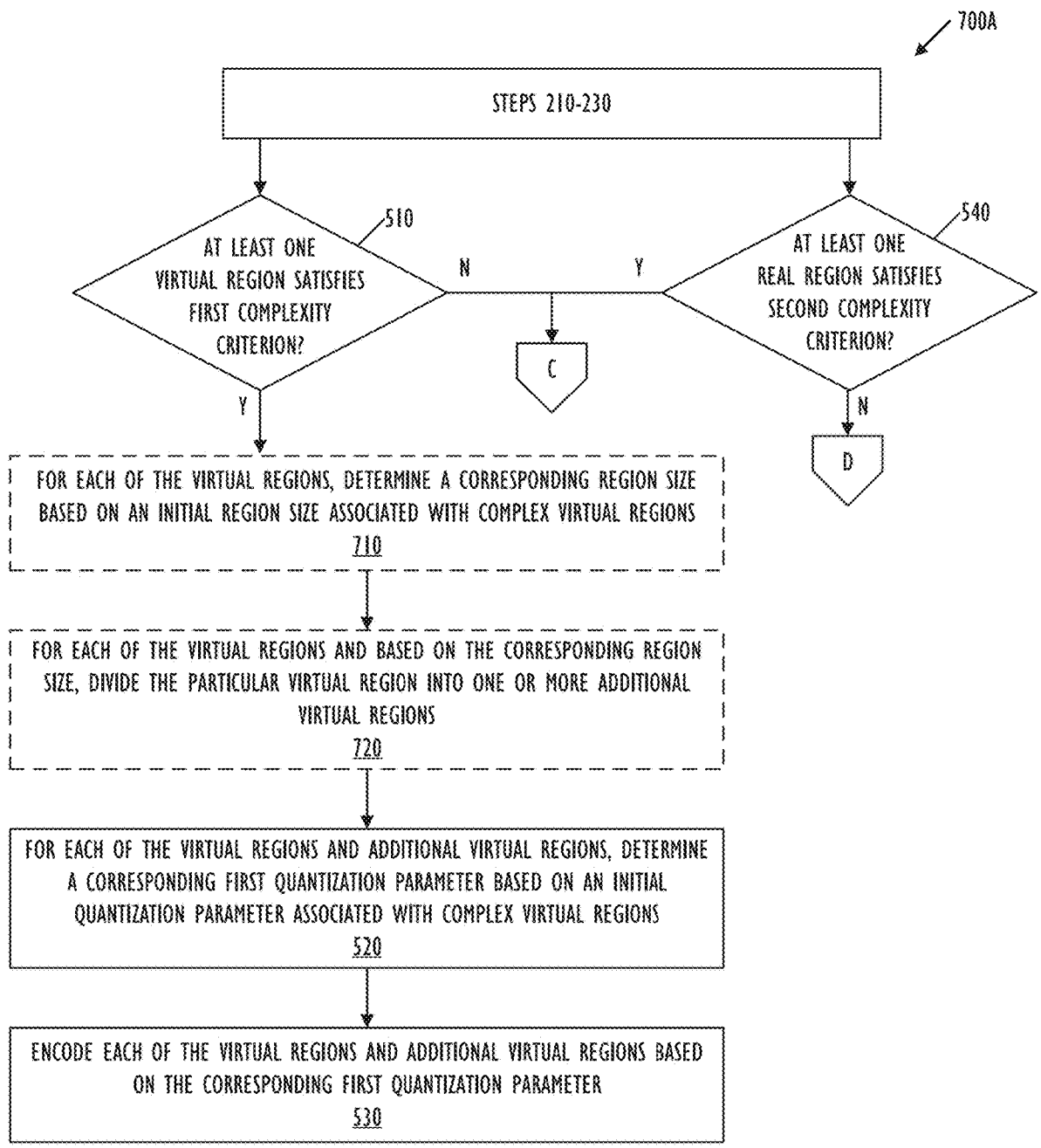
FIGS. 7A-C show, in flowchart form, an example process for encoding an extended reality video frame based on an adaptive quantization matrix, first and second complexity criteria, and adjusted region sizes.
Figure 7B:
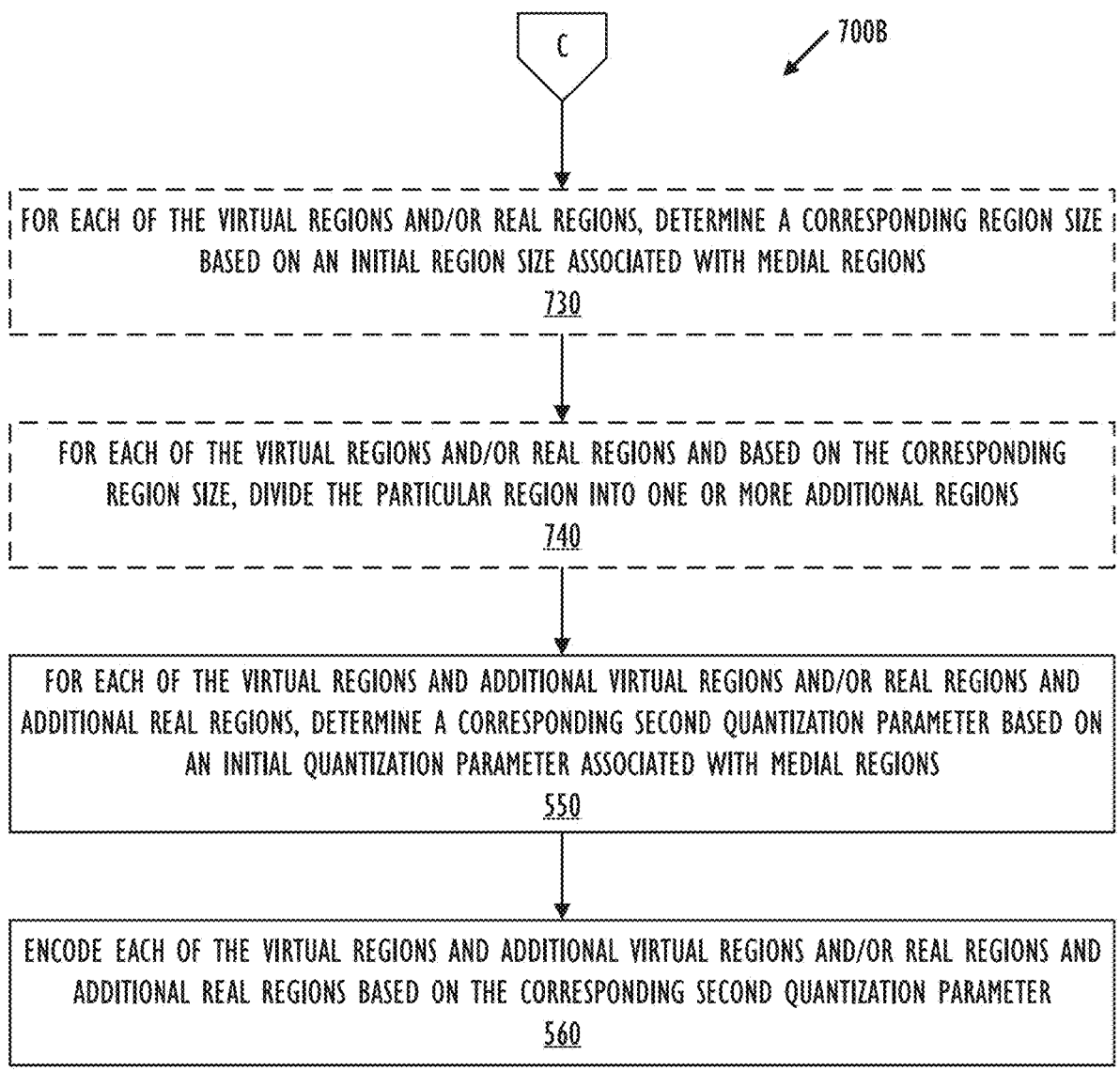
Figure 7C:
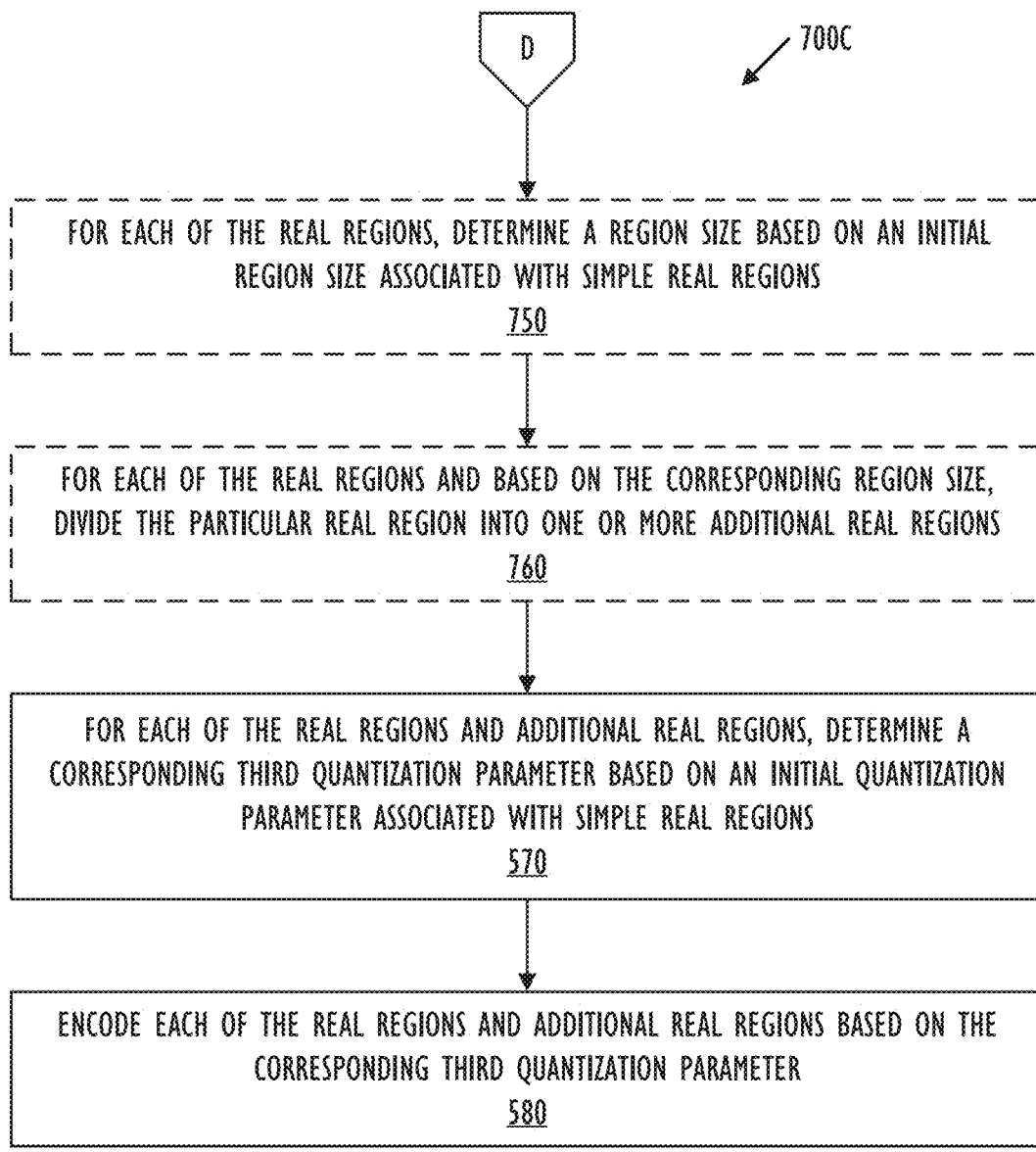

FIGS. 7A-C show, in flowchart form, an example process 700 for encoding an XR video frame based on an adaptive quantization matrix, first and second complexity criteria, and adjusted region sizes. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added. For ease of explanation, the process 700 is described with reference to the process 200 described herein with reference to FIG. 2 and the process 500 described herein with reference to FIGS. 5A-C.

The flowchart 700 begins in FIG. 7A with steps 210, 220, and 230 as described above with reference to FIG. 2. After dividing the XR video frame into at least one virtual region and at least one real region, the electronic device proceeds to step 510 and determines whether at least one virtual region satisfies a first complexity criterion as described above with reference to process 500A shown in FIG. 5A. In response to determining at least one of the virtual regions satisfies the first complexity criterion, the electronic device may optionally proceed to step 710 and determines, for each of the virtual regions that satisfy the first complexity criterion, a corresponding region size based on an initial region size associated with complex virtual regions. The region size may be chosen such that complex portions of the XR video frame have smaller region sizes and simple portions of the XR video frame have larger region sizes.

The electronic device may then optionally, for each of the virtual regions that satisfy the first complexity criterion and based on the corresponding region size, divide the particular virtual region into one or more additional virtual regions at step 720. The electronic device proceeds to step 520 and determines, for each of the virtual regions and additional virtual regions that satisfy the first complexity criterion, a corresponding first quantization parameter based on an initial quantization parameter associated with complex virtual regions as described above with reference to process 500A shown in FIG. 5A. At step 530, the electronic device encodes each of the virtual regions and additional virtual regions that satisfy the first complexity criterion based on the corresponding first quantization parameter as described above with reference to process 500A shown in FIG. 5A.

Returning to step 510, in response to determining at least one virtual region does not satisfy the first complexity criterion, the electronic device may optionally determine, for each of the virtual regions that do not satisfy the first complexity criterion, a corresponding region size based on an initial region size associated with medial regions at step 730 shown in process 700B of FIG. 7B. The initial region size associated with medial regions may be larger than the initial region size associated with complex virtual regions. The electronic device may then optionally, for each of the virtual regions that do not satisfy the first complexity criterion and based on the corresponding region size, divide the particular region into one or more additional regions at step 740.

At step 550, the electronic device determines, for each of the virtual regions and additional virtual regions that do not satisfy the first complexity criterion, a corresponding second quantization parameter based on an initial quantization parameter associated with medial regions as described above with reference to process 500B shown in FIG. 5B. The electronic device encodes each of the virtual regions and additional virtual regions that do not satisfy the first complexity criterion based on the corresponding second quantization parameter at step 560 as described above with reference to process 500B shown in FIG. 5B.

Returning to the at least one real region from step 230, the electronic device determines whether the at least one real region satisfies a second complexity criterion at step 540 as described above with reference to process 500A shown in FIG. 5A. In response to the at least one real region satisfying the second complexity criterion, the electronic device may optionally proceed to step 730 shown in process 700B of FIG. 7B and described above. At step 730, the electronic device may optionally determine, for each of the real regions that satisfy the second complexity criterion, a corresponding region size based on the initial region size associated with medial regions. The electronic device may optionally proceed to step 740 and for each of the real regions that satisfy the second complexity criterion and based on the corresponding region size, divide the particular real region into one or more additional real regions.

At step 550, the electronic device determines, for each of the real regions and additional real regions that satisfy the second complexity criterion, a corresponding second quantization parameter based on an initial quantization parameter associated with medial regions as described above with reference to process 500B shown in FIG. 5B. The second quantization parameters for the real regions and additional real regions satisfying the second complexity criterion may be the same or different than the second quantization parameters for the virtual regions and additional virtual regions not satisfying the first complexity criterion. The electronic device then encodes each of the real regions and additional real regions that satisfy the second complexity criterion based on the corresponding second quantization parameter at step 560 as described above with reference to process 500B shown in FIG. 5B.

Returning to step 540, in response to determining the at least one real region does not satisfy the second complexity criterion, the electronic device may optionally proceed to step 750 shown in process 700C of FIG. 7C. At step 750, the electronic device may optionally determine, for each of the real regions that do not satisfy the second complexity criterion, a corresponding region size based on an initial region size associated with simple real regions. The initial region size associated with simple real regions may be larger than the initial region size associated with medial regions and the initial region size associated with complex virtual regions. The electronic device may optionally proceed to step 760 and for each of the real regions that do not satisfy the second complexity criterion and based on the corresponding region size, divide the particular real region into one or more additional real regions.

At step 570, the electronic device determines, for each of the real regions and additional real regions that do not satisfy the second complexity criterion, a corresponding third quantization parameter based on an initial quantization parameter associated with simple real regions as described above with reference to process 500C shown in FIG. 5C. The electronic device encodes each of the real regions and additional real regions that do not satisfy the second complexity criterion based on the corresponding third quantization parameter at step 580 as described above with reference to process 500C shown in FIG. 5C. While the process 700 illustrates three types of regions—complex virtual regions, medial regions, and simple real regions—any number of types of regions and corresponding complexity criterion, initial region sizes associated with the types of regions, initial quantization parameters associated with the types of regions, and upper and lower threshold limits associated with the types of regions may be used instead.

Figure 8:
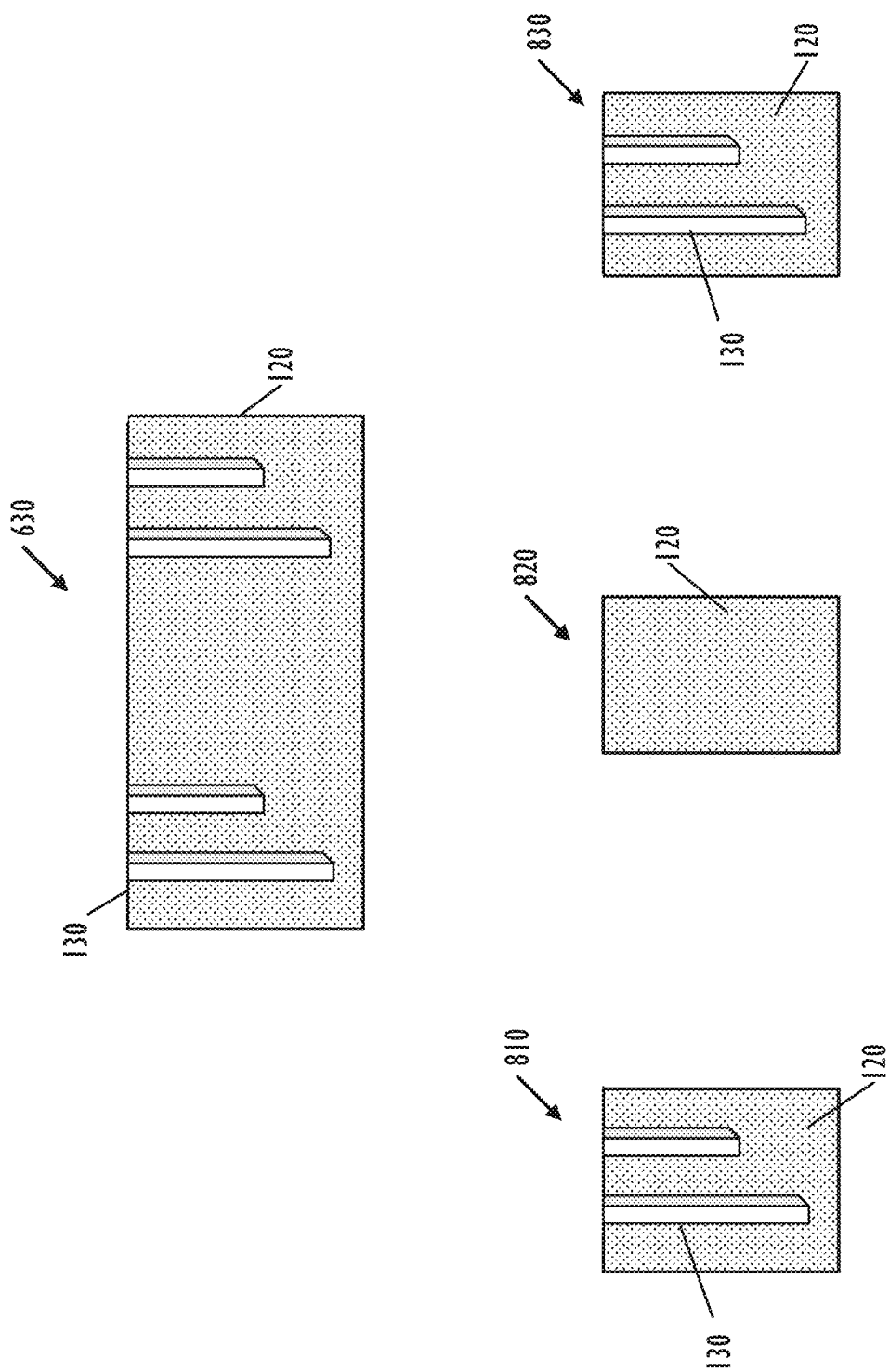
FIG. 8 shows an example diagram of a medial region of an extended reality video frame divided into regions based on first and second complexity criteria and adjusted region sizes.

FIG. 8 shows an example diagram of a medial region 630 of the XR video frame 100 divided into regions based on the first and second complexity criteria and adjusted region sizes discussed herein with respect to process 700. The medial region 630 includes portions of the background image 140 that satisfy the second complexity criterion and shows the legs of the table 130 against a portion of the rug 120. The medial region 630 is divided into additional medial regions 810, 820, and 830. The additional medial region 810 includes two legs of the table 130 against a portion of the rug 120. The additional medial region 820 includes a portion of the rug 120. The additional medial region 830 includes two legs of the table 130 against a portion of the rug 120. The initial region size associated with medial regions may cause the electronic device to determine a smaller region size for medial region 630, and divide medial region 630 into the additional, smaller medial regions 810, 820, and 830. While FIG. 8 shows the medial region 630 divided into three additional, smaller medial regions 810, 820, and 830, the medial regions may be divided into any number of additional medial regions. In addition, the additional medial regions 810, 820, and 830 may be the same or different sizes.

The corresponding second quantization parameters for the medial regions 810 and 830 may be smaller than the corresponding second quantization parameter for the medial region 820 to account for the added edge complexity, contrast, and the like of the legs of the table 130 against a portion of rug 120 in medial regions 810 and 830 compared to the medial region 820 showing only a portion of the rug 120. That is, the medial regions 810 and 830 may be allocated more bits and a higher image resolution than the medial region 820 during video-encoding. FIG. 8 shows an example diagram of additional medial regions 810, 820, and 830 for the medial region 630, but complex virtual region 610 and simple real region 620 may be similarly divided into additional regions.

Figure 9:
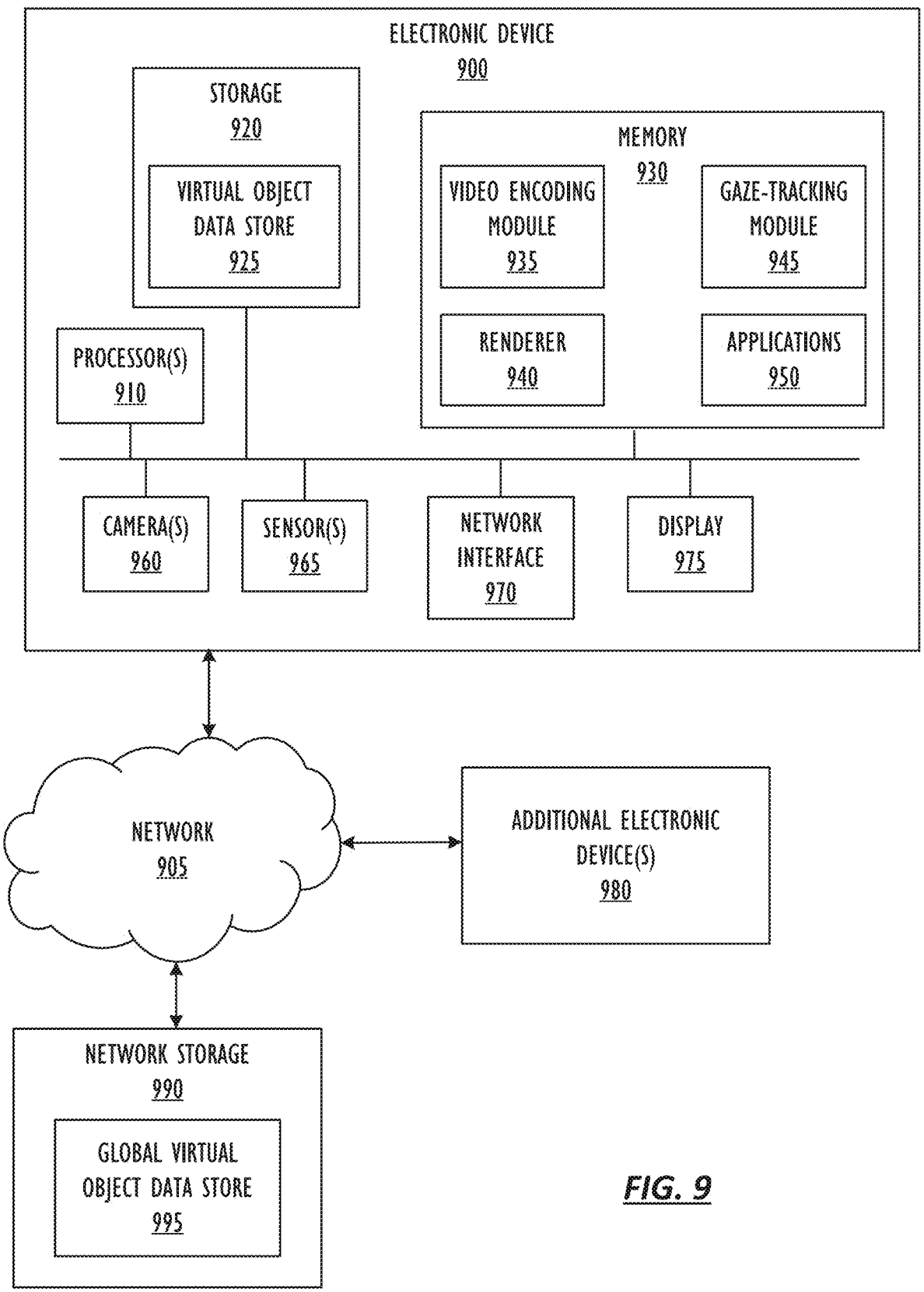
FIG. 9 shows, in block diagram form, exemplary systems for encoding extended reality video streams.

Referring to FIG. 9, a simplified block diagram of an electronic device 900 is depicted, communicably connected to additional electronic devices 980 and a network device 990 over a network 905, in accordance with one or more embodiments of the disclosure. Electronic device 900 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 900, additional electronic device 980, and/or network device 990 may additionally, or alternatively, include one or more additional devices within which the various functionality may be contained, or across which the various functionality may be distributed, such as server devices, base stations, accessory devices, and the like. Illustrative networks, such as network 905 include, but are not limited to, a local network such as a universal serial bus (USB) network, an organization's local area network, and a wide area network such as the Internet. According to one or more embodiments, electronic device 900 is utilized to enable a multi-view video codec. It should be understood that the various components and functionality within electronic device 900, additional electronic device 980 and network device 990 may be differently distributed across the devices, or may be distributed across additional devices.

Electronic device 900 may include one or more processors 910, such as a central processing unit (CPU). Processor(s) 910 may include a system-on-chip such as those found in mobile devices and include one or more dedicated graphics processing units (GPUs). Further, processor(s) 910 may include multiple processors of the same or different type. Electronic device 900 may also include a memory 930. Memory 930 may include one or more different types of memory, which may be used for performing device functions in conjunction with processor(s) 910. For example, memory 930 may include cache, ROM, RAM, or any kind of transitory or non-transitory computer readable storage medium capable of storing computer readable code. Memory 930 may store various programming modules for execution by processor(s) 910, including video encoding module 935, renderer 940, a gaze-tracking module 945, and other various applications 950. Electronic device 900 may also include storage 920. Storage 920 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 920 may be configured to store virtual object data 925, according to one or more embodiments. Electronic device may additionally include a network interface 970 from which the electronic device 900 can communicate across network 905.

Electronic device 900 may also include one or more cameras 960 or other sensors 965, such as a depth sensor, from which depth of a scene may be determined. In one or more embodiments, each of the one or more cameras 960 may be a traditional RGB camera, or a depth camera. Further, cameras 960 may include a stereo- or other multi-camera system, a time-of-flight camera system, or the like. Electronic device 900 may also include a display 975. The display device 975 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 920 may be utilized to store various data and structures which may be utilized for dividing an XR video frame into virtual and real regions and encoding the virtual regions based on a first quantization parameter and the real regions based on a second quantization parameter. According to one or more embodiments, memory 930 may include one or more modules that comprise computer readable code executable by the processor(s) 910 to perform functions. The memory 930 may include, for example a video encoding module 935 which may be used to encode an XR video frame, a renderer 940 which may be used to generate an XR video frame, a gaze-tracking module 945 which may be used to determine a user's gaze position and an area of interest in the image stream, as well as other applications 950.

Although electronic device 900 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 10:
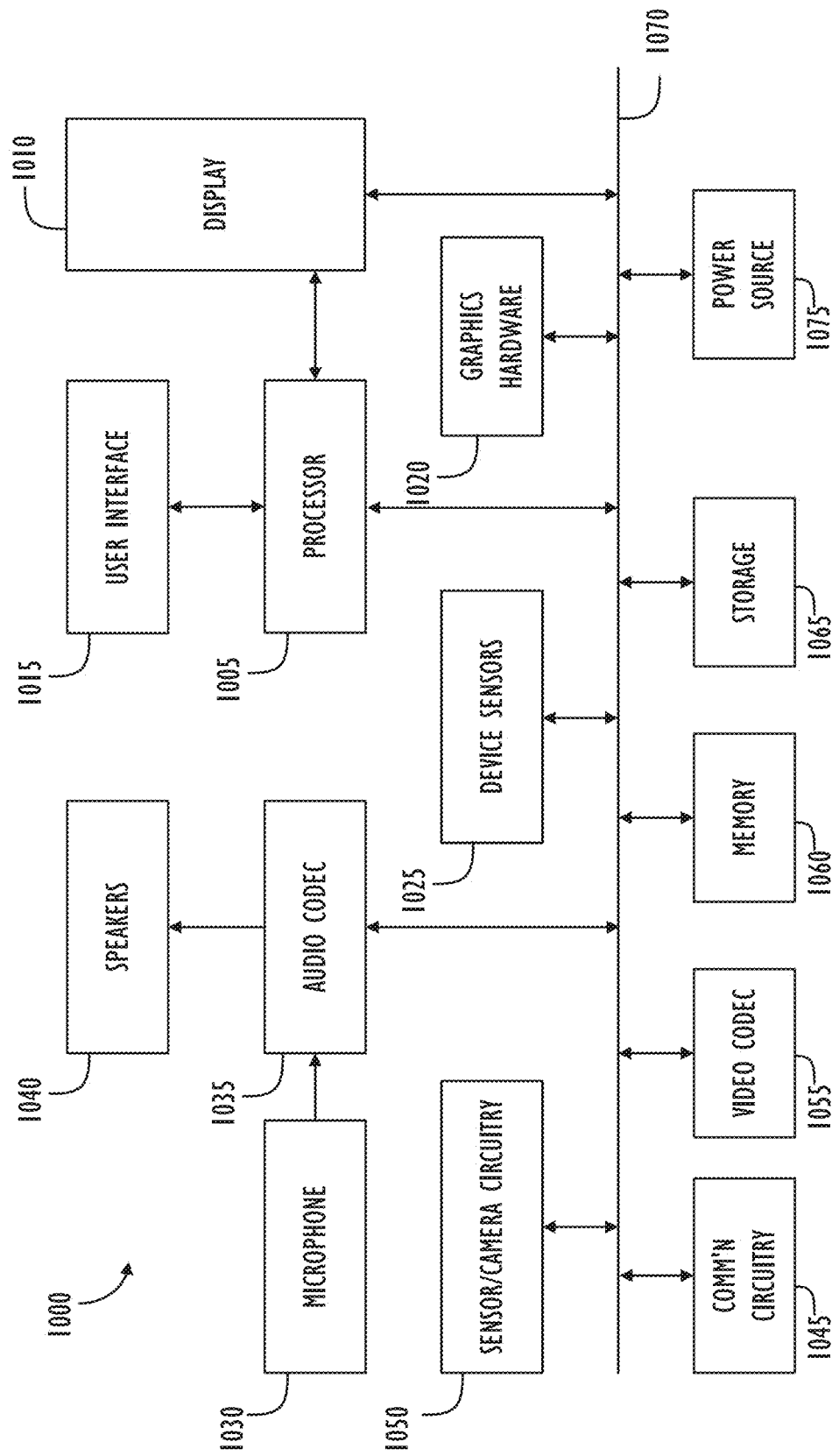
FIG. 10 shows an exemplary system for use in various video encoding systems, including for encoding extended reality video streams.

Referring now to FIG. 10, a simplified functional block diagram of an illustrative programmable electronic device 1000 for providing access to an app store is shown, according to one embodiment. Electronic device 1000 could be, for example, a mobile telephone, personal media device, portable camera, or a tablet, notebook or desktop computer system, network device, wearable device, or the like. As shown, electronic device 1000 may include processor 1005, display 1010, user interface 1015, graphics hardware 1020, device sensors 1025 (e.g., proximity sensor/ambient light sensor, accelerometer and/or gyroscope), microphone 1030, audio codec(s) 1035, speaker(s) 1040, communications circuitry 1045, image capture circuit or unit 1050, which may, e.g., comprise multiple camera units/optical sensors having different characteristics (as well as camera units that are housed outside of, but in electronic communication with, device 1000), video codec(s) 1055, memory 1060, storage 1065, and communications bus 1070.

Processor 1005 may execute instructions necessary to carry out or control the operation of many functions performed by device 1000 (e.g., such as the generation and/or processing of app store metrics accordance with the various embodiments described herein). Processor 1005 may, for instance, drive display 1010 and receive user input from user interface 1015. User interface 1015 can take a variety of forms, such as a button, keypad, dial, a click wheel, keyboard, display screen and/or a touch screen. User interface 1015 could, for example, be the conduit through which a user may view a captured video stream and/or indicate particular images(s) that the user would like to capture or share (e.g., by clicking on a physical or virtual button at the moment the desired image is being displayed on the device's display screen).

In one embodiment, display 1010 may display a video stream as it is captured while processor 1005 and/or graphics hardware 1020 and/or image capture circuitry contemporaneously store the video stream (or individual image frames from the video stream) in memory 1060 and/or storage 1065. Processor 1005 may be a system-on-chip such as those found in mobile devices and include one or more dedicated graphics processing units (GPUs). Processor 1005 may be based on reduced instruction-set computer (RISC) or complex instruction-set computer (CISC) architectures or any other suitable architecture and may include one or more processing cores. Graphics hardware 1020 may be special purpose computational hardware for processing graphics and/or assisting processor 1005 perform computational tasks. In one embodiment, graphics hardware 1020 may include one or more programmable graphics processing units (GPUs).

Image capture circuitry 1050 may comprise one or more camera units configured to capture images, e.g., in accordance with this disclosure. Output from image capture circuitry 1050 may be processed, at least in part, by video codec(s) 1055 and/or processor 1005 and/or graphics hardware 1020, and/or a dedicated image processing unit incorporated within circuitry 1050. Images so captured may be stored in memory 1060 and/or storage 1065. Memory 1060 may include one or more different types of media used by processor 1005, graphics hardware 1020, and image capture circuitry 1050 to perform device functions. For example, memory 1060 may include memory cache, read-only memory (ROM), and/or random access memory (RAM). Storage 1065 may store media (e.g., audio, image and video files), computer program instructions or software, preference information, device profile information, and any other suitable data. Storage 1065 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1060 and storage 1065 may be used to retain computer program instructions or code organized into one or more modules and written in any desired computer programming language. When executed by, for example, processor 1005, such computer program code may implement one or more of the methods described herein. Power source 1075 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 1000.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2, 4, 5A-C, and 7A-C or the arrangement of elements shown in FIGS. 9 and 10 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for encoding an extended-reality (XR) video frame, comprising:
    obtaining an XR video frame comprising a background image and a virtual object overlaying at least a portion of the background image;
    dividing the XR video frame into a first region comprising virtual content and a second region comprising real content within a physical environment, and a third region comprising virtual content and real content, wherein the first region comprises at least a portion of the virtual object, the second region comprises a region of the background image separate from the first region, and the third region comprises a portion of the virtual object and a portion of the background image;
    determining, for the first region, a corresponding first quantization parameter based on an initial quantization parameter associated with virtual regions;
    determining, for the second region, a corresponding second quantization parameter based on an initial quantization parameter associated with real regions;
    determining, for the third region, a corresponding third quantization parameter based on an initial quantization parameter associated with medial regions; and
    encoding the first region based on the corresponding first quantization parameter, the second region based on the corresponding second quantization parameter, and the third region based on the corresponding third quantization parameter.

2. The method of claim 1, wherein determining, for the first region, the corresponding first quantization parameter is further based on a threshold upper limit associated with virtual regions and a threshold lower limit associated with virtual regions.

3. The method of claim 1, wherein determining, for the second region, the corresponding second quantization parameter is further based on a threshold upper limit associated with real regions and a threshold lower limit associated with real regions.

4. The method of claim 1, wherein:
    the first region comprises at least a portion of the virtual object that satisfies a first complexity criterion;
    the second region comprises a first portion of the second region of the background image separate from the first region, wherein the first portion of the second region fails to satisfy a second complexity criterion; and
    the third region comprises at least one of: (i) a portion of the at least one virtual object that fails to satisfy the first complexity criterion, and (ii) a second portion of the second region of the background image separate from the first region, wherein the second portion of the second region satisfies the second complexity criterion.

5. The method of claim 4, wherein determining, for the third region, the corresponding third quantization parameter is further based on a threshold upper limit associated with medial regions and a threshold lower limit associated with medial regions.

6. The method of claim 1, further comprising obtaining an input indicative of an area of focus via a gaze-tracking user interface, wherein dividing the XR video frame is based at least in part on the area of focus.

7. A non-transitory computer readable medium, comprising computer code executable by at least one processor to:
    obtain an extended reality (XR) video frame comprising a background image and a virtual object overlaying at least a portion of the background image;
    divide the XR video frame into a first region comprising virtual content, a second region comprising real content within a physical environment, and a third region comprising virtual content and real content, wherein the first region comprises at least a portion of the virtual object, the second region comprises a region of the background image separate from the first region, and the third region comprises a portion of the virtual object and a portion of the background image;
    determine, for the first region, a corresponding first quantization parameter based on an initial quantization parameter associated with virtual regions;
    determine, for the second region, a corresponding second quantization parameter based on an initial quantization parameter associated with real regions;
    determine, for the third region, a corresponding third quantization parameter based on an initial quantization parameter associated with medial regions; and
    encode the first region based on the corresponding first quantization parameter, the second region based on the corresponding second quantization parameter, and the third region based on the corresponding third quantization parameter.

8. The non-transitory computer readable medium of claim 7, wherein the computer readable code to determine, for the first region, the corresponding first quantization parameter further comprises computer readable code to determine the corresponding first quantization parameter further based on a threshold upper limit associated with virtual regions and a threshold lower limit associated with virtual regions.

9. The non-transitory computer readable medium of claim 7, wherein the computer readable code to determine, for the second region, the corresponding second quantization parameter further comprises computer readable code to determine the corresponding second quantization parameter further based on a threshold upper limit associated with real regions and a threshold lower limit associated with real regions.

10. The non-transitory computer readable medium of claim 7, wherein the initial quantization parameter associated with virtual regions is smaller than the initial quantization parameter associated with real regions.

11. The non-transitory computer readable medium of claim 7, wherein the computer readable media further comprises computer readable code executable by the at least one processor to:
for the first region:
determine a corresponding first region size based on an initial region size associated with virtual regions; and
divide the first region into one or more additional virtual regions based on the corresponding first region size;
for the real regions:
determine a corresponding second region size based on an initial region size associated with real regions; and
divide the second region into one or more additional real regions based on the corresponding second region size.

12. The non-transitory computer readable medium of claim 11, wherein the initial region size associated with virtual regions is smaller than the initial region size associated with real regions.

13. The non-transitory computer readable medium of claim 7, wherein:
the computer readable code to divide the XR video frame further comprises computer readable code to divide the XR video frame into a third region;
the first region comprises at least a portion of the virtual object that satisfies a first complexity criterion;
the second region comprises a first portion of the second region of the background image separate from the first region, wherein the first portion of the second region fails to satisfy a second complexity criterion; and
the third region comprises at least one of: (i) a portion of the virtual object that fails to satisfy the first complexity criterion, and (ii) a second portion of the second region of the background image separate from the first region, wherein the second portion of the second region satisfies the second complexity criterion; and
the non-transitory computer readable medium further comprises computer readable code executable by the at least one processor to:
determine, for the third region, a corresponding third quantization parameter based on an initial quantization parameter associated with medial regions; and
encode the third region based on the corresponding third quantization parameters.

14. The non-transitory computer readable medium of claim 13, wherein the computer readable code to determine, for the third region, the corresponding third quantization parameter further comprises computer readable code to determine the corresponding third quantization parameter further based on a threshold upper limit associated with medial regions and a threshold lower limit associated with medial regions.

15. The non-transitory computer readable medium of claim 13, wherein the initial quantization parameter associated with medial regions is smaller than the initial quantization parameter associated with real regions and larger than the initial quantization parameter associated with virtual regions.

16. The non-transitory computer readable medium of claim 13, wherein the computer readable media further comprises computer readable code executable by the at least one processor to:
for the first region:
determine a corresponding first region size based on an initial region size associated with virtual regions; and
divide the first region into one or more additional virtual regions based on the corresponding first region size;
for the second region:
determine a corresponding second region size based on an initial region size associated with real regions; and
divide the second region into one or more additional real regions based on the corresponding second region size; and
for the third region:
determine a corresponding third region size based on an initial region size associated with medial regions; and
divide the third region into one or more additional medial regions based on the corresponding third region size.

17. The non-transitory computer readable medium of claim 16, wherein the initial region size associated with medial regions is larger than the initial region size associated with virtual regions and smaller than the initial region size associated with real regions.

18. The non-transitory computer readable medium of claim 7, wherein the computer readable media further comprises computer readable code executable by the at least one processor to obtain an input indicative of an area of focus via a gaze-tracking user interface, wherein the computer readable code to divide the XR video frame further comprises computer readable code to divide the XR video frame based at least in part on the area of focus.

19. A device, comprising:
an image capturing device configured to capture a background image;
at least one processor; and
at least one computer readable media comprising computer readable code executable by the at least one processor to:
obtain an extended reality (XR) video frame comprising the background image and a virtual object overlaying at least a portion of the background image;
divide the XR video frame into a first region, a second region, and a third region, wherein the first region comprises at least a portion of the virtual object, the second region comprises a portion of the background image separate from the first region, and the third region comprises another portion of the virtual object and another portion of the background image separate from the first and second regions;
determine, for the first region, a corresponding first quantization parameter based on an initial quantization parameter associated with virtual regions;
determine, for the second region, a corresponding second quantization parameter based on an initial quantization parameter associated with real regions;
determine, for the third region, a corresponding third quantization parameter based on an initial quantization parameter associated with medial regions; and
encode the first region based on the corresponding first quantization parameter, the second region based on the corresponding second quantization parameter, and the third region based on the corresponding third quantization parameter.

20. The system of claim 19, wherein the computer readable code to determine, for the first region, the corresponding first quantization parameter further comprises computer readable code to determine the corresponding first quantization parameter further based on a threshold upper limit associated with virtual regions and a threshold lower limit associated with virtual regions.

* * * * *